United States Patent [19]

Mathison et al.

[11] Patent Number: 4,493,344

[45] Date of Patent: Jan. 15, 1985

[54] MECHANICAL PLUG DEVICE

[75] Inventors: Allen D. Mathison, Richfield; Dale K. Nelson, Minneapolis; Lloyd G. Cherne, Edina, all of Minn.

[73] Assignee: Cherne Industries, Inc., Minneapolis, Minn.

[21] Appl. No.: 484,172

[22] Filed: Apr. 13, 1983

[51] Int. Cl.³ .............................................. B65D 39/12
[52] U.S. Cl. ........................................ 138/89; 411/34
[58] Field of Search ...................... 138/89; 411/34, 35, 411/36, 37, 38, 49

[56] References Cited

U.S. PATENT DOCUMENTS

| 1,919,666 | 7/1933 | Patterson | 411/34 |
| 2,154,498 | 4/1939 | Eagar | 138/89 |
| 2,720,893 | 10/1955 | Foreman | 138/89 |
| 3,291,156 | 12/1966 | Corsano | 138/89 |
| 3,613,936 | 10/1971 | Kaiser | 138/89 |

FOREIGN PATENT DOCUMENTS

| 404319 | 6/1966 | Switzerland | 138/89 |
| 477061 | 12/1937 | United Kingdom | 411/35 |

Primary Examiner—John W. Shepperd
Attorney, Agent, or Firm—Anthony G. Eggink

[57] ABSTRACT

The mechanically operable plug device is for use with the end of a pipe or conduit. The plug device is for removably sealing the conduit end so that the conduit can be tested for leaks. The mechanically operable plug device is comprised of two spacially parallel plate members, a narrow, elastomeric, and radially expandable O-ring member which is disposed between the plate members, and adjustable lateral force means which is operable on the parallel plate members. The radially expandable O-ring member has a circumferentially disposed surface for engaging the interior surface of a conduit to be sealed, and a generally V-shaped cross section having inclined surfaces of a predetermined slope. The plate members have interiorly facing tapered shoulders of generally the same predetermined slope to engage the inclined surfaces of the O-ring. Subsequent to the placement of the plug device into a conduit end, the positive adjustment of the lateral force means causes the sloped opposing shoulders to impart lateral forces to the inclined surfaces of the O-ring to, thereby, cause it to expand outwardly to seal a conduit.

7 Claims, 7 Drawing Figures

MECHANICAL PLUG DEVICE

This invention relates to a mechanically operable plug device for the removable sealing of a conduit or pipe end. Particularly, this invention relates to removable plug devices for temporarily sealing pipeline systems or networks to permit subsequent testing for leaks.

The mechanical plug device according to the teachings of the invention is useful to test gravity sewer lines in the construction of residential and commercial buildings. The mechanical plug device provides a means for temporarily plugging the lines, so that air or another fluid can be pumped into the line system to check it for leaks. Subsequent the test, the mechanical plug device is easily removed from the respective pipe ends, so that further construction work can be continued or completed.

In the past, several types of pipe plug devices have been proposed or utilized for puposes of testing pipeline networks, such as sewer lines. However, many of these prior art devices, have been of the pneumatic type, which utilize hollow rubber cylinders that are inserted into a pipe end, and then expanded. These pneumatic plug devices, however, require the addition of a fluid, such as air, to be functional, and are constructed of relatively expensive materials.

Additionally, plug devices of the mechanical type have been proposed for sealing purposes. Some of these devices have been constructed of metallic plates and other expensive components. They generally utilize a pair of end plates for engaging the side edges of a hollow rubber cylinder. The hollow rubber cylinder has typically had a width that is substantially greater than the width of either end plate, thus requiring a considerable amount of rubber for fabricating the cylinder for the plug. And, some devices have, because of the cylinder size, required that the outer walls of the cylinder be grooved about its periphery to provide the necessary gripping with the interior of a pipe wall to insure a proper seal. These prior art devices have not provided a simple and economically constructed mechanical plug, using inexpensive materials, which is capable of providing effective seals for a pipe or conduit end, and which is readily operable without mechanical aid.

The mechanical plug devices according to the teachings of this invention overcome the difficulties, limitations, and other shortcomings of the prior art devices. Particularly, the mechanical plug devices of the invention provide mechanically operable plugs for removably and positively sealing gravity sewer lines for subsequent testing. The devices are simple and inexpensively constructed, and provide means which permit them to be manually inserted, tightened and then removed from a pipe end, subsequent to testing a pipeline system.

In summary, this invention provides a mechanical plug device for the removable sealing of pipes or conduits for leak testing purposes. The plug device is comprised of two spacially parallel plate members, a narrow, elastomeric, and radially expandable O-ring member which is disposed between the plate members, and adjustable lateral force means which is operable on the parallel plate members. The radially expandable O-ring member has a circumferentially disposed surface for engaging the interior surface of a conduit to be sealed, and a generally V-shaped cross section having inclined surfaces of a predetermined slope. The plate members have interiorly facing tapered shoulders of generally the same predetermined slope to engage the inclined surfaces of the O-ring. Subsequent to the placement of the plug device into a conduit end, the positive adjustment of the lateral force means causes the sloped opposing shoulders to impart lateral forces to the inclined surfaces of the O-ring to, thereby, cause it to expand outwardly to seal a conduit.

Additionally provided by the invention are plate members having portions which aid in aligning the plug device to a pipe end, and provided are plastic plate members having elements which strengthen the device structure while minimizing the amount of material required to mold the respective plate members.

Also provided by the invention are plug devices having inner plate members which have a plurality of rib members extending radially from its tapered shoulders for gripping the inclined surfaces of the O-rings to prevent relative movement between the inner plate members and the O-rings as the lateral force means are adjusted.

The invention also provides for O-ring member material constructions suited for sealing pipes or conduits, and adjustable lateral force means which are suited for hand operation. And, plug device elements are provided which further ensure the sealability and aid the mechanical operation of the device for releasably sealing the ends of conduits or pipes.

These and other benefits of this invention will become clear from the following description, by reference to the drawings, wherein.

Figure 1:
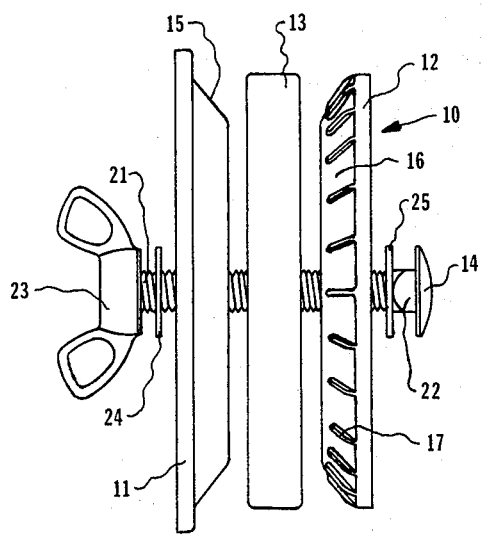
FIG. 1 is a lateral, schematic view of the mechanically operable plug device according to the teachings of this invention.
Figure 3:
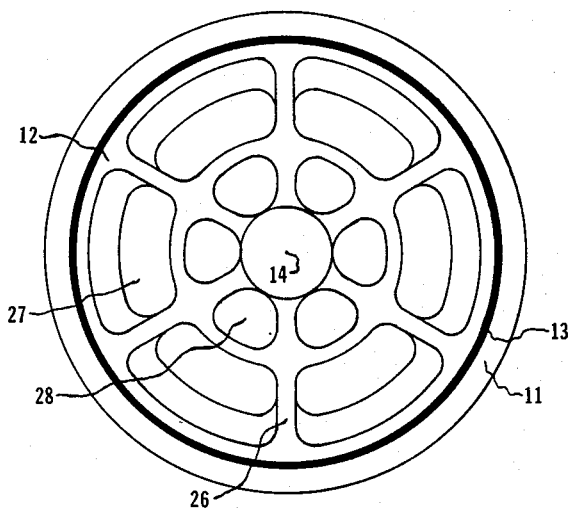
FIG. 3 is a schematic, plan view of the right exterior of the mechanically operable plug of the invention as shown in FIG. 1, and which is shown in an assembled condition.

Referring to FIGS. 1 and 3, a mechanically operable plug device 10 is shown as having a pair of spacially parallel plate members 11 and 12. The outer plate member 11 and inner plate member 12 are preferably of a unitary, molded plastic construction having interiorly facing tapered shoulders or sloped edges 15 and 16, respectively. The plate members 11 and 12, as shown, have centrally disposed and aligned apertures for receiving therethrough an adjustable lateral force means 14.

Figure 2:
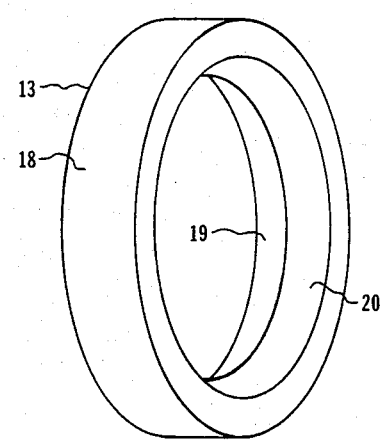
FIG. 2 is a perspective, schematic view of the O-ring member of the mechanical plug of the invention.
Figures 4, 5:
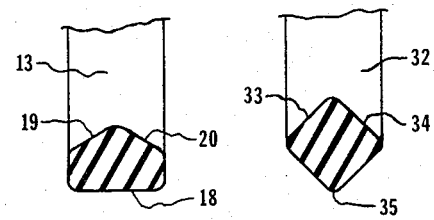
FIG. 4 is a cross sectional, schematic view of an O-ring member of the mechanical plug of the invention.
FIG. 5 is a cross sectional, schematic view of another embodiment of an O-ring member of the mechanical plug of the invention.
Figure 6:
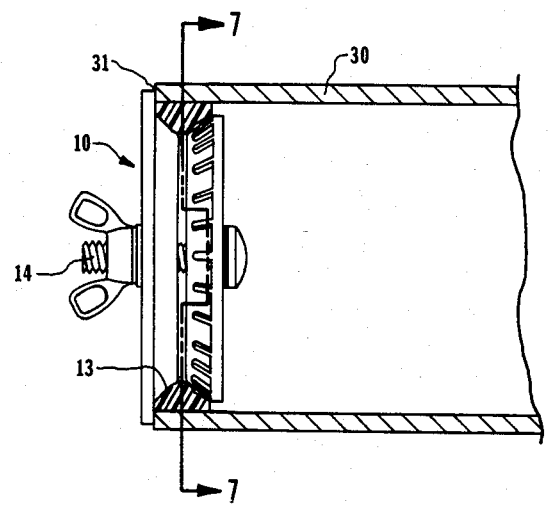
FIG. 6 is a lateral, cross sectional view of a mechanical plug of the invention, and shown in sealing position in a pipe or conduit end.

A narrow, elastomeric, and radially expandable O-ring member 13 is disposed between the plate members 11 and 12. As seen in FIGS. 2 and 4, the O-ring member 13 has an inner circumferential V-shaped cross section which defines inclined surfaces 19 and 20 for abutting the tapered shoulders 15 and 16 of plate members 11 and 12. Additionally, an outer circumferential surface 18 is for contact with the inner wall of a conduit or pipe, as shown in FIG. 6.

Figure 7:
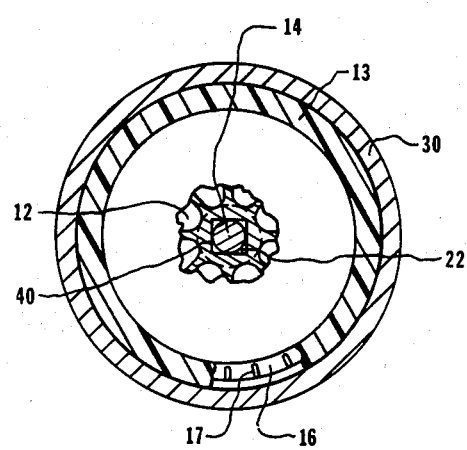
FIG. 7 is a cross sectional view of the mechanical plug taken on lines 7—7 of FIG. 6 and which further has a cut out view to illustrate the radial rib members and the slotted aperture of the inner plate member.

An adjustable lateral force means 14 is operable on the plate members 11 and 12. This lateral force means 14 is shown in FIG. 1 to be comprised of an elongated, threaded bolt having a squared head portion 22, a threaded shaft 21 and a wing nut 23. A plastic or rubber washer 25 is disposed between the head portion 22 of the bolt and the inner plate member 12 to ensure that the plug 10 itself does not leak when a pressure differential exists on either side. A nylon washer 24 is disposed between outer plate member 11 and the wing nut 23 to provide a rotational buffer between the two elements as the wing nut 23 is either rotated onto or from the threaded shaft 21. Thus, the washer member 24 prevents the outer plate 11 from rotating with the wing nut 23 because of the relatively low coefficient of friction of the nylon washer. Thus as shown in FIG. 7, the squared head portion 22 of the threaded bolt engages the squared aperture 40 in inner plate 12 so that the bolt does not rotate with respect to plate 12 as it is tightened.

Importantly, as shown in FIG. 1, the inclined or conically extending inner face 16 of inner plate 12 has a plurality of rib members 17 extending upwardly and radially therefrom. The radial rib members 17 are for gripping the inclined surface 20 of the O-ring 13 to prevent the relative rotational movement between the inner plate member 12 and the O-ring 13 as the lateral force means 14 is adjusted. This is particularly important when the plug device 10 is inserted or removed from a conduit or pipe end so that spinning of the inner plate 12 is prevented during the tightening or loosening operation by the adjustment of means 14.

FIG. 3 illustrates a frontal view of plug device 10. The adjustable lateral force means 14, such as the threaded bolt 21 and wing nut 23 arrangement, is shown centrally extending through the plate member 12. The O-ring 13, which is generally the diameter of inner plate 12, is shown, as is the outwardly extending flange portion of outer plate 11. The inner plate member 12 has indented, structural molded portions 27 which define the inclined, circumferential edge 16 on the opposite side of the plate 12. Additionally, the outwardly extending molded portions 26 provide for the structural strength necessary for the plates, particularly when molded or formed from plastic. The inwardly disposed indented portions 28 provide for structural strength for the plates, while minimizing the amount of plastic required for molding. The outer plate 11, is molded similarly to that of the inner plate 12 here shown.

FIG. 6 of the drawings illustrates the mechanical plug device 10 in a sealing position at a pipe or conduit end 31 of pipe or conduit 30. Although the plug devices of the invention can be utilized on any conduit end, it has been found particularly suited for temporarily plugging sewer pipeline ends so that the pipeline system itself can be tested for leaks. Generally, such pipes have a diameter in excess of one inch, and are, typically, 1¼", 2", 3", 4", 6" and 8". The plug device 10, thus, has dimensions to correspond to these pipe diameters. As shown in FIG. 6, the upper flange of outer plate 11 abuts the pipe end 31, while the O-ring 13 and inner plate 12 extend into the conduit 30.

The O-ring 13 is of a narrow, elastomeric, and radially expandable construction, so that its outer surface 18 can be expanded outwardly to seal the interior conduit wall, and so that, because of its memory, it can be reduced in diameter as the lateral force means 14 is decreased in force. A material that has been found useful for O-ring construction has been plasticized polyvinyl chloride. However, rubber, neoprene, urethane and like materials can also be utilized.

The O-ring 13 has a inner circumferential cross section which define a pair of inclined surfaces 19 and 20. The incline or slope of these surfaces is of a predetermined configuration. It has been found that an angle, from the ridge, of approximately 40 degrees is suitable for plug devices desgined for use on pipes having a diameter ranging from one to four inches. Plugs designed for larger pipes can have slopes up to 60 degrees.

The tapered shoulders 15 and 16 of plates 11 and 12 are generally of the same slope as the O-ring 13, with which it is used. Thus, as the adjustable lateral force means 14 is adjusted inwardly, the opposing plate member shoulders squeeze or push the O-ring member at its inclined surfaces to cause the expandable O-ring to sealingly engage the interior wall structure of a conduit. The O-ring 13 is generally of a narrow width which permits the opposing plate members 11 and 12 to brought together without making actual contact with one another.

FIG. 6 illustrates the hand operable mechanical plug 10 as shown in FIG. 1, in a sealing position at conduit end 31. The sealing ring 30 has been expanded outwardly by the tightening of adjustment means 14. As discussed above, the sealing ring 30 is of a narrow construction and it expands radially outward as the opposing shoulders 15 and 16 of plate members 11 and 12 are moved inwardly or closer together. The expansion of sealing ring 30 squeezes the outer surface 18 against the interior surface of conduit 30 as the shoulder portions 15 and 16 of the opposing plates 11 and 12 approach each other. Or, when using the O-ring embodiment 32 shown in FIG. 5, the apex ridge 35 is squeezed against the conduit 30 interior as the plug is operated to seal. Thus, the narrowness of the sealing ring 30, therefore, as stated above, is generally the width of the combined width measurements, or twice the width of either individual shoulder portions 15 and 16. And, the sealing surfaces 18 and 35, respectively, are equal to or less than the O-ring 13 or 32 body width.

The opposing plate members 11 and 12 are preferably formed of a durable plastic so that they are rigid and capable of withstanding the torsion forces imparted by the lateral force means, such as from the tightening of wing nut 23 on the bolt 21. Additionally, the radial ribs are integrally formed on the inner plate 12 so that they indent into the inclined surface of the O-ring. The inclined surface 15 of outer plate 11 is generally of a smooth configuration so that slippage can occur if necessary. The nylon or similarly constructed washer 24 additionally provides for slippage with the wing nut 23, while ensuring a fluid seal through the aperture of the plate 11. As mentioned above, the washer 25 provides a similar fluid seal for the squared or slotted aperture in plate 12, which receives the communicating bolt head 22, for example.

FIG. 5 illustrates another embodiment of the O-ring. There, the O-ring 32 has a generally diamond shaped cross section having inclined surfaces 33 and 34 for communicating with the tapered shoulders of the opposing plate members. However, this configuration provides an circumferentially disposed apex ridge 35 which sealingly abuts the interior surface of a pipe or conduit. Other O-ring designs could also be utilized within the teachings of the invention, as long as the inclined surfaces are provided for communication with the tapered shoulders of the plate members.

In use, with the plug device 10 inserted in a pipe or conduit 30, as shown in FIG. 6, and with the flange member of the outer plate abutting the pipe end, the device can be easily adjusted to seal the conduit by means of the wing nut, for example. Generally, in a typical test of a gravity sewer line system, a plurality of plug devices are utilized to seal the necessary pipe ends. Because of the device construction, having a narrow O-ring, the devices can be easily finger tightened, and the devices remain sealingly and snugly in place during the testing procedure to provide the necessary continuous seal required for proper testing. Generally, the testing procedure utilizes the pumping of air or water into the pipeline system. Subsequent the completion of the test for leaks, the plugs are easily and quickly removable so that the construction job can be completed or continued. The plug devices 10 are durable so that they can be reused, if desired; however, they are inexpensive enough to be discarded, depending upon the nature of the construction.

As many changes are possible to the embodiments of this invention, utilizing the teachings thereof, the description above, and the accompanying drawings, should be interpreted in the illustrative, and not in the limited sense.

That which is claimed is:

1. A mechanically hand operable mechanical plug device for the removable sealing of a conduit end, said device comprising:
   (a) a narrow, elastomeric radially expandable O-ring having an essentially narrow outer circumferential surface for engaging the interior surface of a conduit, and an inner circumferential V-shaped cross section having inclined surfaces of a predetermined slope,
   (b) spacially parallel rigid plate members having interiorly facing tapered shoulders of the same said predetermined slope to engage the inclined surfaces of the O-ring, said narrow O-ring having a maximum body width of approximately twice the width of one said interiorly facing shoulders and having a circumferential outer surface width equal to or less than said O-ring body width, said plate members further comprising an inner circular plate member and an outer circular plate member, said inner plate member having a plurality of rib members extending radially from its tapered shoulders for gripping the inclined surface of the O-ring to prevent relative rotational movement between the inner plate member and the O-ring, said predetermined slopes of the O-ring inclined surfaces and the tapered shoulders of the inner and outer plate members being dependent upon the diametric dimensions of the O-ring and being in a range of 40 to 60 degrees as the diameter of the plug device varies to engage conduits of an inside diameter of approximately 1.5 to 8.0 inches, and,
   (c) hand adjustable lateral force means operable on the parallel plate members, whereby, subsequent to the placement of the plug device into a conduit end, the positive adjustment of the lateral force means causes the sloped opposing shoulders to impart lateral forces to the inclined surfaces of the O-ring to, thereby, cause it to expand outwardly to seal a conduit, and, whereby, said narrow O-ring member reaches its sealing diameter before the inner and outer plate members make contact.

2. The plug device of claim 1, wherein said outer circular plate member has a radially extending flange member for abutting the end of a conduit as said plug device is inserted thereinto.

3. The plug device of claim 2, wherein said inner and outer plate members are of a unitary, molded plastic construction, and, wherein said O-ring is of a deformable elastomeric material selected from a group of materials consisting of plasticized polyvinyl chloride, natural rubber, synthetic rubber and urethane.

4. The plug device of claim 1, wherein said inner and outer plate members have central, axial apertures extending therethrough, and, wherein said aperture through the inner plate is slotted, said apertures for receiving said adjustable lateral force means.

5. The plug device of claim 4, wherein said adjustable lateral force means consists of a threaded bolt and wing nut, and wherein said bolt further has a head portion for non-rotationally engaging said slotted aperture of the inner plate member, and wherein said wing nut is hand operable to adjustably impart lateral squeezing forces through said opposing tapered shoulders of said plate members to radially expand said O-ring.

6. The plug device of claim 5, wherein a sealing washer member is disposed between said bolt head and said inner plate member, and wherein a washer member having a low coefficient of friction is disposed between said wing nut and said outer plate member, whereby said sealing washer member further insures the sealability of said plug device for testing purposes, and, whereby said low frictional washer aids the tightening and untightening process of said wing nut onto the threaded portion of the bolt.

7. The plug device of claim 1, wherein said O-ring has an outer circumferentially V-shaped cross section for providing a circumferentially disposed sealing ridge to engage the interior surface of a conduit as said lateral force means of the device is positively or inwardly adjusted.

* * * * *